US009648201B2

(12) United States Patent
Aizawa

(10) Patent No.: US 9,648,201 B2
(45) Date of Patent: May 9, 2017

(54) IMAGE READING APPARATUS WITH JUDGMENT UNIT TO JUDGE DATA OF A PREDETERMINED FORMAT FOR TRANSFER AND WITH EXECUTING UNIT TO CONVERT IMAGE DATA BEFORE THE DATA OF A PREDETERMINED FORMAT IS JUDGED FOR TRANSFER, AND NON-TRANSITORY COMPUTER-READABLE RECORDING MEDIUM

(71) Applicant: Konica Minolta, Inc., Tokyo (JP)

(72) Inventor: Hiroaki Aizawa, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/631,691

(22) Filed: Feb. 25, 2015

(65) Prior Publication Data
US 2015/0312439 A1 Oct. 29, 2015

(30) Foreign Application Priority Data
Apr. 16, 2014 (JP) ................................. 2014-085016

(51) Int. Cl.
*H04N 1/32* (2006.01)

(52) U.S. Cl.
CPC ..... *H04N 1/32459* (2013.01); *H04N 1/32443* (2013.01)

(58) Field of Classification Search
CPC ............ G03G 21/02; G06F 2206/1504; G06F 3/1256; H04N 1/00339
(Continued)

(56) References Cited

U.S. PATENT DOCUMENTS

| 6,516,157 B1 * | 2/2003 | Maruta .................. G03G 21/02 399/79 |
| 2003/0179871 A1 * | 9/2003 | Ito ............................ G06F 3/14 379/93.24 |

(Continued)

FOREIGN PATENT DOCUMENTS

| JP | 2006-325028 A | 11/2006 |
| JP | 2008-066934 A | 3/2008 |

(Continued)

OTHER PUBLICATIONS

Japan Patent Office, Notification of Reasons for Refusal with English translation for application No. 2014-085016, dispatched Apr. 12, 2016, 12 pages.

*Primary Examiner* — Jamares Q Washington
(74) *Attorney, Agent, or Firm* — Squire Patton Boggs (US) LLP

(57) ABSTRACT

Disclosed is an image reading apparatus including: a reading unit configured to optically read an original and to output image data; an image conversion unit configured to convert the image data into data having a predetermined format; a storing unit configured to store the data having the predetermined format; a transfer unit configured to transfer the data to a designated destination; a judgment unit configured to judge whether the data can be transferred to the designated destination; and an executing unit configured to instruct the image reading apparatus to execute a process for reading the original and for converting the image data to store the data in the storing unit regardless of whether the judgment unit judges that the data can be transmitted, and to instruct the image reading apparatus to transfer the data after the judgment unit judges that the data can be transmitted.

30 Claims, 6 Drawing Sheets

(58) Field of Classification Search
USPC ........ 358/1.9, 1.15, 1.16, 1.18, 405; 399/79; 705/52, 408
See application file for complete search history.

(56) References Cited

U.S. PATENT DOCUMENTS

| | | | |
|---|---|---|---|
| 2007/0196121 A1* | 8/2007 | Ohnishi | G03G 21/02 399/79 |
| 2011/0134442 A1* | 6/2011 | Mori | G03G 21/02 358/1.2 |

FOREIGN PATENT DOCUMENTS

| | | |
|---|---|---|
| JP | 2009-111592 | 5/2009 |
| JP | 2011-055268 A | 3/2011 |
| JP | 2013-214951 A | 10/2013 |
| JP | 2013-225727 A | 10/2013 |

* cited by examiner

IMAGE READING APPARATUS WITH JUDGMENT UNIT TO JUDGE DATA OF A PREDETERMINED FORMAT FOR TRANSFER AND WITH EXECUTING UNIT TO CONVERT IMAGE DATA BEFORE THE DATA OF A PREDETERMINED FORMAT IS JUDGED FOR TRANSFER, AND NON-TRANSITORY COMPUTER-READABLE RECORDING MEDIUM

BACKGROUND OF THE INVENTION

Field of the Invention

The present invention relates to an image reading apparatus a non-transitory computer-readable recording medium for converting image data obtained by reading an original by a scanner and transferring the data.

Description of Related Art

There is a multi function peripheral for charging a user for the copy of an original or the like. For example, there is an image processing apparatus which checks whether a user inserts money which is not less than a charge fee necessary for executing all processes designated by the user, and which starts the processes in case that it is confirmed that the money which is not less than the necessary charge fee is inserted (See Japanese Patent Application Publication No. 2009-111592).

Among multi function peripherals to which an external recording medium, such as a USB (Universal Serial Bus) memory or the like, is detachably attached, there is a multi function peripheral for executing a job for converting the image data obtained by reading an original by a scanner into the data having the designated format as a file, and for storing the file in a USB memory (Scan To USB job). In case that an original having a plurality of sheets is processed in accordance with the above job, in general, as shown in the process method A of FIG. 6, by executing the process for converting the image data of the read pages and for transferring the file generated by converting the image data to a USB memory in parallel with the operation for reading the original, the whole process time is shortened.

In case of the Scan To USB job, because the charge fee is calculated according to the number of sheets of the original, the image size, color/monochrome, or the like, the charge fee cannot be decided until the whole original have been read. Therefore, when the process is executed by using the process method A shown in FIG. 6, the file is transferred to a USB memory without confirming that the necessary charge fee is paid. A wrong action in which the USB memory is withdrawn without paying the necessary charge fee, cannot be prevented.

In view of the above problem, the following process method B is considered. In the process method B, the charge fee is decided by reading the whole original and the image data obtained by reading the original are temporarily stored in the image processing apparatus. After it is confirmed that the money which is not less than the decided charge fee is inserted, the image data stored in the image processing apparatus are converted and the data are transferred to the USB memory. In the process method B, because the image conversion and the data transfer are started after the reading of the original is finished, the whole process time is longer than that of the process method A.

For example, it is assumed that the job for reading the original having fifty sheets to convert the image data of the original and for transferring the data to the USB memory is executed in accordance with the process method B shown in FIG. 6. In this case, the process time for converting the image data of one sheet of an original having A4 size into the data as a file having the PDF (Portable Document Format) format is 1 second, the file size of the data for one sheet of the original is 50 KB, the transfer speed of the data to the USB memory is 30 MB/s, and the reading time for reading the original having fifty sheets by the scanner is 80 seconds. The whole process time is calculated by the equation: the reading time (80 seconds)+ the image conversion time (1 second×50 sheets)+ the transfer time (1 second)=131 seconds.

In case that the process method A shown in FIG. 6 is used, the reading of the original and the image conversion/data transfer are executed in parallel. Therefore, the whole process time for the job is only the reading time (80 seconds)+ alpha. As described above, when the process method B is adopted in order to charge the fee, in case of the reading of 50 sheets, the whole process time is about 50 seconds longer than that of the process method A.

Not only in case that the data are stored in a USB memory, but also, for example, in case that a user is charged for the job for transmitting the file obtained by the image conversion to an external terminal via the network, the above problem is caused. Further, in addition to the case in which the charge fee is paid, for example, in case that the upper limit of the number of the sheets which can be used by each user or in each section of a company is managed, the above problem is caused.

SUMMARY

To achieve at least one of the abovementioned objects, an image reading apparatus reflecting one aspect of the present invention, comprises:

a reading unit configured to optically read an original and to output image data corresponding to the original;

an image conversion unit configured to convert the image data into data having a predetermined format;

a storing unit configured to store the data having the predetermined format, which is obtained by converting the image data by the image conversion unit;

a transfer unit configured to transfer the data to a designated destination;

a judgment unit configured to judge whether the data can be transferred to the designated destination; and an executing unit configured to instruct the image reading apparatus to execute a process for reading the original by the reading unit and for converting the image data output from the reading unit by the image conversion unit to store the data in the storing unit regardless of whether the judgment unit judges that the data can be transmitted, and to instruct the image reading apparatus to transfer the data after the judgment unit judges that the data can be transmitted.

Preferably, the judgment unit judges whether the data can be transferred, by comparing an amount of inserted money with a charge fee, or by comparing number of remaining sheets to an upper limit of number of available sheets with number of sheets of the original.

Preferably, the image reading apparatus further comprises a connecting unit configured to detachably connect a recording medium, wherein the recording medium connected with the connecting unit is allowed to be designated as the destination.

Preferably, after the reading unit finishes reading all pages of the original, the judgment unit judges whether the data for all pages of the original can be transferred to the destination.

Preferably, the executing unit instructs the image reading apparatus to start transferring the data after the image conversion unit finishes converting the image data for all pages of the original into the data.

Preferably, after the judgment unit judges that the data for all pages of the original can be transferred to the destination, the executing unit changes a transfer route so as to transfer the data output from the image conversion unit to the destination without using the storing unit, and instructs the image reading apparatus to read the data which is stored in the storing unit before the transfer route is changed, from the storing unit and to transfer the read data to the destination.

Preferably, it is selected whether the judgment unit judges whether the data can be transmitted, in case that the judgment unit does not judge whether the data can be transmitted, the executing unit instructs the image reading apparatus to transmit the data output from the image conversion unit to the destination without using the storing unit.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
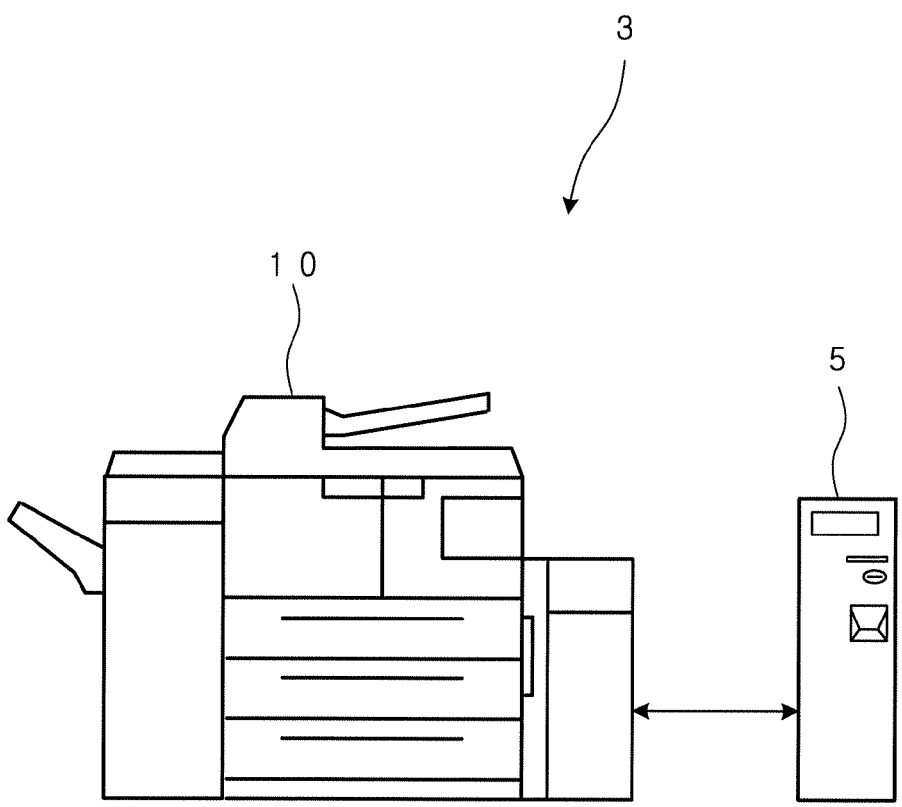
FIG. 1 is a view showing an example of the charging system including the image reading apparatus according to the embodiment.

FIG. 1 shows an example of the charging system 3 in which the charging vender device 5 is connected with the image reading apparatus 10 according to the embodiment. The image reading apparatus 10 is a so-called multi function peripheral having the function for executing a plurality of types of jobs, such as a copy job for printing out an image on a recording sheet by optically reading an original, a scan job (including a Scan To USB job which will be explained below, and the like) for storing the image data of the read original as a file or transmitting the file to an external terminal via a network, a print job for printing out an image by forming the image on a recording sheet in accordance with the print data received from a terminal device via the network, a FAX job for transmitting and receiving image data in compliance with the facsimile protocol, and the like.

The image reading apparatus 10 can operate in the charging mode in which the usage fee is charged and in the non-charging mode in which the usage fee is not charged. The mode to be used can be switched by selecting the mode in accordance with the operation of an administrator or the like.

The image reading apparatus 10 is connected with the charging vender device 5 via the communication cable. The charging vender device 5 has a function for receiving the inserted bills and/or coins, collecting the necessary charge fee from the inserted money, and discharging the change. The image reading apparatus 10 informs the charging vender device 5 of the necessary charge fee. In case that the charge vender device 5 collects the necessary charge fee, the charging vender device 5 informs the image reading apparatus 10 that the charge fee is collected. Further, in case that a bill or a coin, for example, at least one-cent coin, is inserted, the charging vender device 5 informs the image reading apparatus 10 that a user starts inserting the money.

Figure 2:
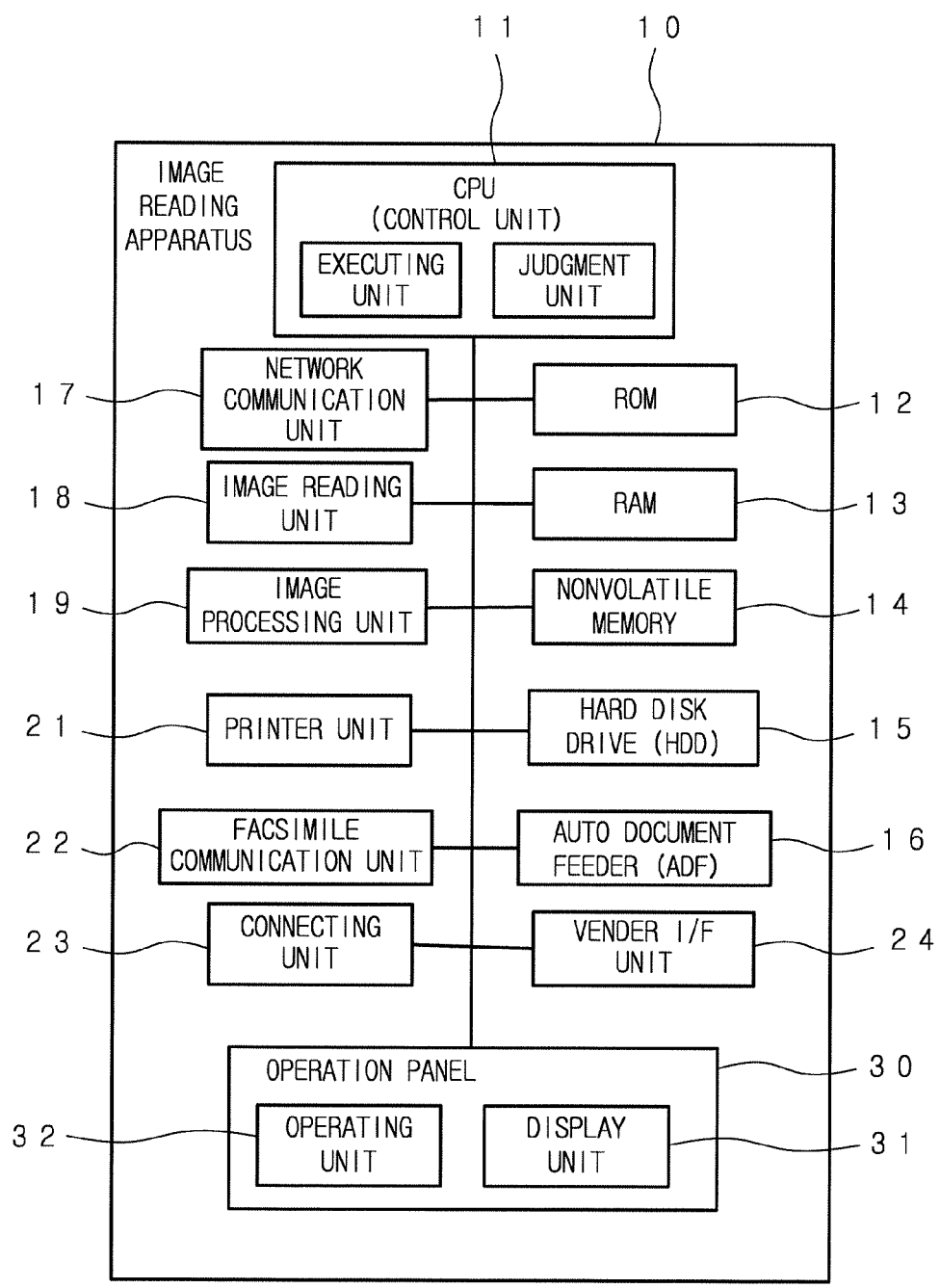
FIG. 2 is a block diagram showing the schematic configuration of the image reading apparatus according to the embodiment.

FIG. 2 is a block diagram showing the electric schematic configuration of the image reading apparatus 10. The image reading apparatus 10 comprises a CPU (Central Processing Unit) 11 as a control unit for entirely controlling the operation of the image reading apparatus 10. The CPU 11 is connected with a ROM (Read Only Memory) 12, a RAM (Random Access Memory) 13, a nonvolatile memory 14, a hard disk drive 15, an auto document feeder (ADF) 16, a network communication unit 17, an image reading unit 18, an image processing unit 19, a printer unit 21, a facsimile communication unit 22, a connecting unit 23, a vender I/F (Interface) unit 24, an operation panel 30, and the like, via a bus.

By the CPU 11, a middleware, application programs and the like are executed on an OS (Operating System) program as a base. In the ROM 12, various types of programs are stored. By executing the processes by the CPU 11 in accordance with these programs, the functions of the image reading apparatus 10 are realized. The CPU 11 executes the image conversion process for converting the image data into a file having the predetermined format. Further, the CPU 11 has the function as the executing unit for instructing each unit of the image reading apparatus 10 to execute the process for reading an original by the image reading unit 18 and for converting the image data output from the image reading unit 18 by the image processing unit 19 or the like, to store the data in the storing unit (the RAM 13, the nonvolatile memory 14 and the hard disk drive 15), and the process for transferring the data obtained by the conversion to the designated destination, and has the function as the judgment unit for judging whether the data can be transferred.

The RAM 13 is used as a work memory for temporarily storing various data when the CPU 11 executes the process in accordance with the programs and as an image memory for storing image data.

The nonvolatile memory 14 is a memory (flash memory) in which the stored contents are not damaged even if the image reading apparatus 10 is turned off, and is used for storing various setting information and the like.

The hard disk drive 15 is a large-capacity nonvolatile memory device. In the hard disk drive 15, various types of programs and data are stored in addition to the print data, the data for the window to be displayed, and the like. The temporary area which will be explained is secured in the hard disk drive 15 and the like. The RAM 13, the nonvolatile memory 14 and the hard disk drive 15 function as the storing unit for storing various data.

The network communication unit 17 has the function for communicating with an external terminal, a server or the like, which is connected via the network, such as a LAN (Local Area Network) or the like. The network communication unit 17 has the function for transmitting a file to an external terminal in compliance with the protocol, such as FTP (File Transfer Protocol), SMB (Server Message Block) or the like. Further, the network communication unit 17 has the Wi-Fi function.

The image reading unit 18 has the function as the reading unit for obtaining (outputting) the image data by optically reading an original. For example, the image reading unit 18 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The auto document feeder 16 has the function for conveying the original by feeding the original set to the original setting tray from the top sheet one by one, passing the original through the reading position of the image reading unit 18 and discharging the original to a predetermined discharge position. The image reading unit 18 has the function for reading the original set on a platen glass, and has the function for sequentially reading the original which is conveyed by the auto document feeder 16.

The image processing unit 19 executes the rasterization process for converting print data into image data, the compression/decompression process for the image data, the process for converting the image data into the data having the predetermined format, and the like in addition to the processings, such as the enlargement/reduction and the rotation of image data. That is, the image processing unit 19 has the function as the image conversion unit for converting the image data into the data having the predetermined format.

The printer unit 21 has the function for forming an image on the recording sheet in accordance with the image data. In this embodiment, the printer unit 21 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 22 has the function for transmitting and receiving the image data to/from an external device having the facsimile function via a telephone line.

The connecting unit 23 has the function for detachably connecting a recording medium, such as a USB memory or the like with the image reading apparatus 10. The connecting unit 23 comprises a connector and an I/F (Interface) circuit. The vender I/F unit 24 is an interface for connecting the image reading apparatus 10 with the charging vender device 5.

The operation panel 30 comprises a display unit 31 and an operating unit 32, and has the function for displaying various types of operating windows, setting windows and the like, and the function for receiving various types of operations, such as the entry of the job or the like, from the user.

The display unit 31 comprises a liquid crystal display (LCD), the driver thereof, and the like. The operating unit 32 comprises various types of hardware keys, such as a start button, a numeric keypad, and the like, a touch panel provided on the display screen of the display unit 31, and the like. The touch panel detects the coordinate position on which the display screen of the display unit 31 is contacted by a touch pen, the user's finger or the like to operate the image reading apparatus 10.

Next, the operation in which the image reading apparatus 10 executes a Scan To USB job for reading an original by using a scanner, converting the image data obtained by the reading of the original into the data having the format designated by a user (in this embodiment, the data having the designated format (for example, PDF)) and transferring the data obtained by converting the image data to a USB memory which is connected with the connecting unit 23, to store the data in the USB memory, will be explained.

Figure 3:
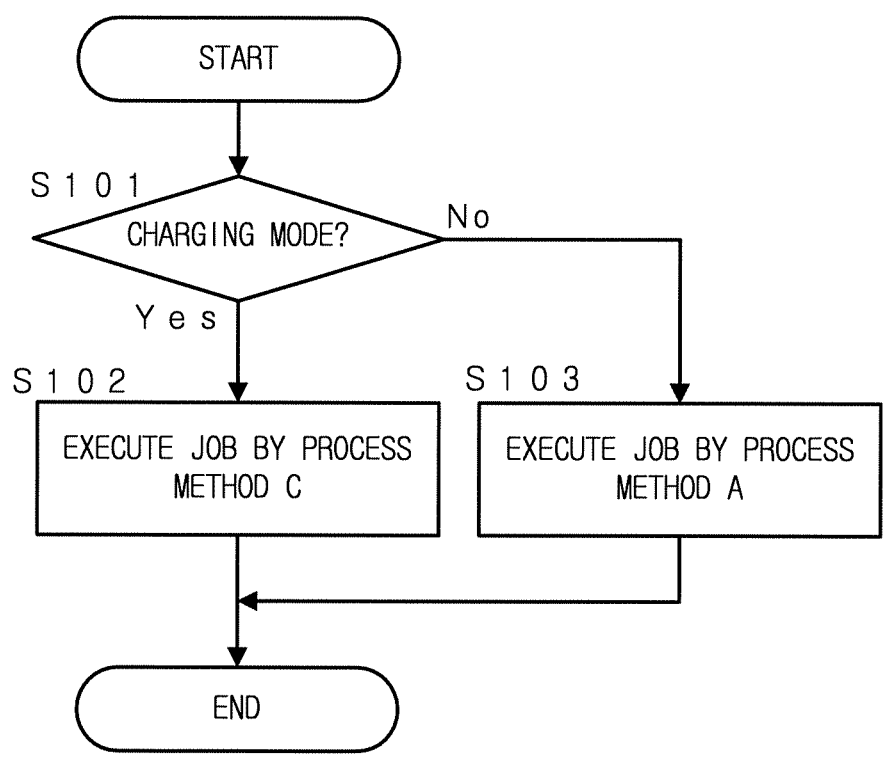
FIG. 3 is a flowchart showing the whole process for executing the Scan To USB job by the image reading apparatus according to the embodiment.
Figure 6:
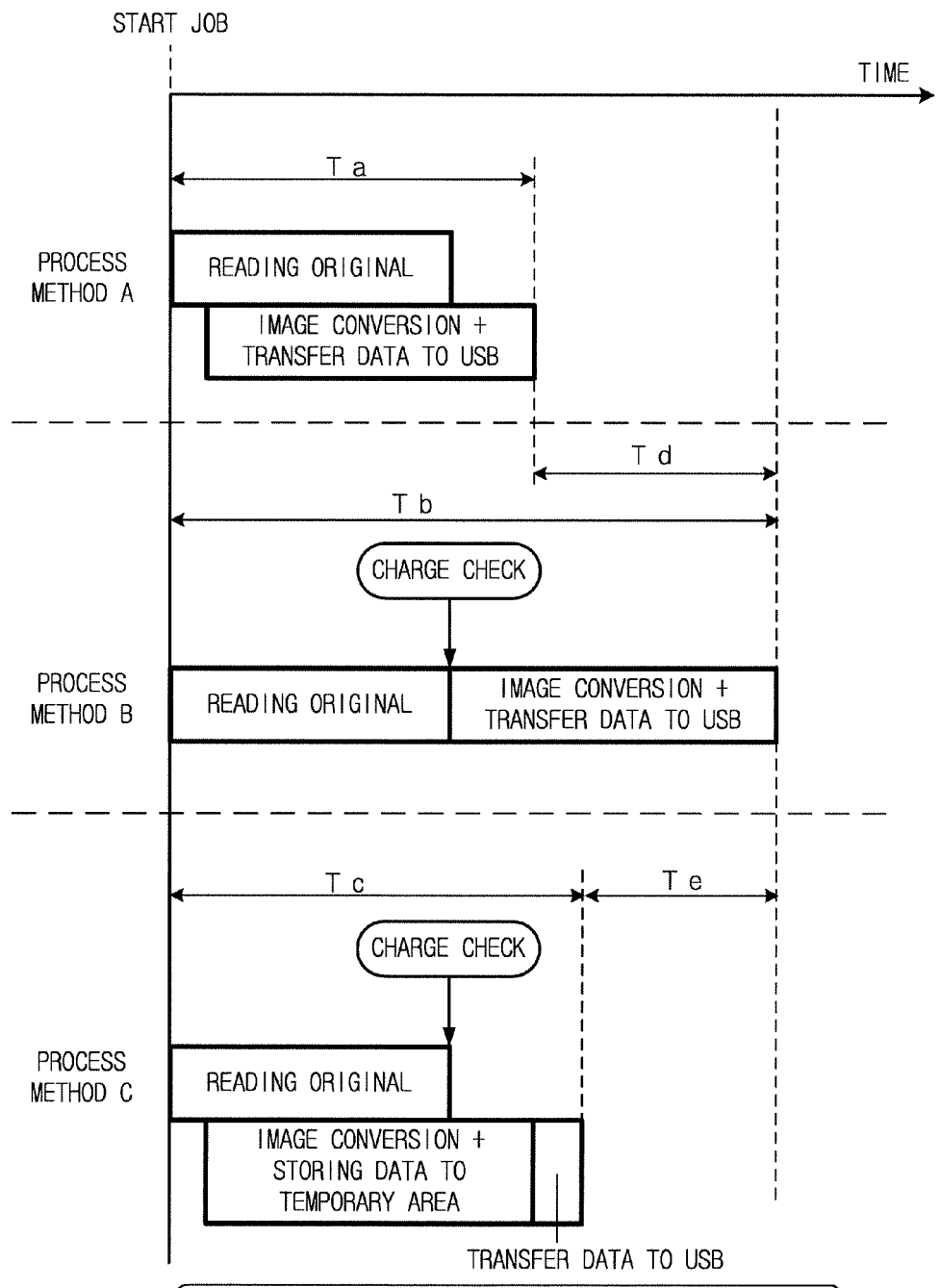
FIG. 6 is a view showing the summary of the process method A, the process method B and the process method C.

FIG. 3 is a flowchart showing the whole process for executing the Scan To USB job by the image reading apparatus 10. In the image reading apparatus 10, the CPU 11 executes the following process by reading the programs stored in the ROM 12. When the image reading apparatus 10 receives the instruction for executing the Scan To USB job, the CPU 11 judges whether the charging mode is set or not (Step S101). In case that the charging mode is not set (Step S101; No), the image reading apparatus 10 executes the Scan To USB job by the process method A shown in FIG. 6 (Step S103).

In detail, the original set to the auto document feeder 16 is sequentially read by the image reading unit 18. In parallel with this operation, the image reading apparatus 10 executes the image conversion process for converting the image data obtained by the reading of the original into the data having the format designated by a user, and the transfer process for transferring the data obtained by the image conversion to the USB memory connected with the connecting unit 23 to store the data in the USB memory. That is, by carrying out the setting relating to the charging mode, an administrator or the like can select whether the CPU 11 (the judgment unit) executes the judgment process for judging whether the above transfer process can be executed. In case that the CPU 11 (the judgment unit) does not execute the above judgment process, the CPU 11 (the executing unit) instructs the image reading apparatus 10 to transfer the data output from the image processing unit 19 or the like to the USB memory without using the hard disk drive 15 or the like.

In case that the charging mode is set (Step S101; Yes), the image reading apparatus 10 executes the Scan To USB job by the process method C shown in FIG. 6 (Step S102). In the process method C, the original set to the auto document feeder 16 is sequentially read by the image reading unit 18 and in parallel with this operation, the image reading apparatus 10 executes the image conversion process and stores the data obtained by the image conversion in the temporary area of the image reading apparatus 10. The temporary area is provided in the RAM 13 or the hard disk drive 15.

When the reading of the whole original set to the auto document feeder 16 is finished, the CPU 11 (the judgment unit) judges whether the data can be transferred to the USB memory (the destination). In this embodiment, CPU 11 executes the charge check in order to execute the above judgment process depending on whether the necessary charge fee is paid. Then, in case that the data can be transferred, the CPU 11 (the executing unit) instructs each unit of the image reading apparatus 10 to execute the process for transferring the data obtained by the image conversion to the USB memory and storing the data. That is, in the process method C, the CPU 11 (the executing unit) instructs each of the image reading apparatus 10 to execute the process for converting the image data obtained by reading the original and for storing the data in the temporary area regardless of whether it is judged that the data can be transferred in the charge check. After it is judged that the data can be transferred, the CPU 11 (the executing unit) instructs each unit of the image reading apparatus 10 to execute the process for transferring the data obtained by the image conversion to the USB memory.

Therefore, in the process method C, it is possible to prevent the data obtained by the image conversion from being transferred to the user's USB memory in the situation in which the charge fee is not paid. Further, because the reading of the image and the image conversion are executed in parallel, it is possible to shorten the whole process time as compared with the process method B.

Next, the process in which the Scan To USB job is executed by the process method C will be explained. The process method C includes the first mode in which the transfer of the data which are judged as the transferable data is executed after the image conversion for the whole original is finished, and the second mode in which the transfer route is switched while the image conversion is executed.

Figure 4:
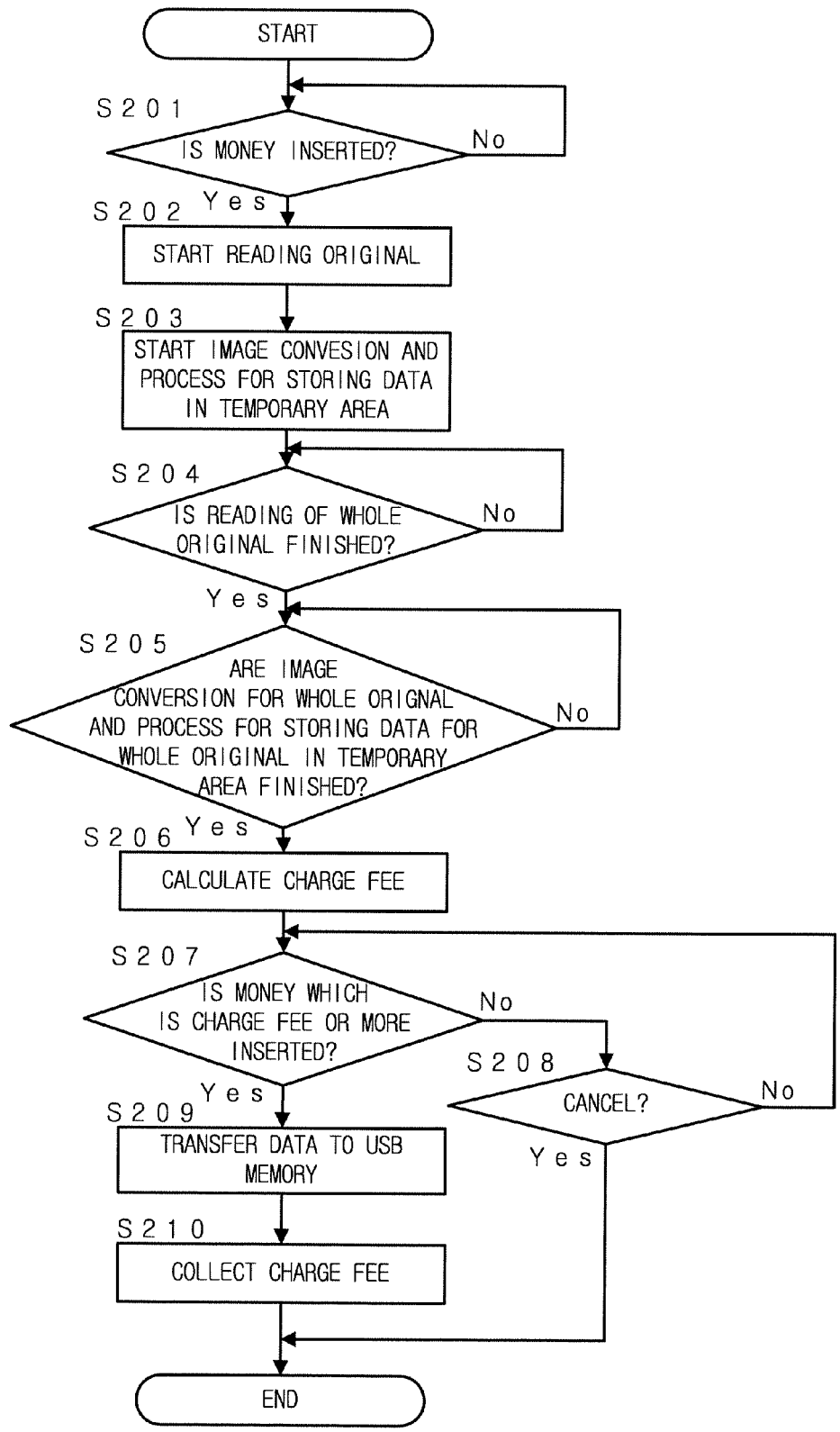
FIG. 4 is a flowchart showing the process for executing the Scan To USB job in accordance with the first mode of the process method C by the image reading apparatus according to the embodiment.

FIG. 4 shows the process for executing the Scan To USB job in accordance with the first mode of the process method C. Firstly, the CPU 11 checks whether the money is inserted in the charging vender device 5 (Step S201). Because the charge fee is not decided until the reading of the original is finished, the amount of money inserted at this time may be the predetermined minimum amount (for example, one cent) or more.

In case that the money is inserted (Step S201; Yes), the reading of the original is started (Step S202). Further, in parallel, the image conversion and the process for storing the data obtained by the image conversion in the temporary area are started (Step S203). Specifically, in the image conversion process, it is checked whether one or more pages of the unprocessed image data which have not been converted are left. In case that one or more pages of the unprocessed image data are left, the image conversion is executed for each page. The data obtained by the image conversion are immediately stored in the temporary area. As described above, in parallel with the reading of the original, the image conversion and the process for storing the data in the temporary area are executed.

When the reading of the whole original is finished (Step S204; Yes), it is checked whether the image conversion and the process for storing the data in the temporary area, which are executed for the image data of the read whole original (all pages) are finished (Step S205). In case that the image conversion and the process for storing the data in the temporary area are not finished (Step S205; No), the image conversion and the process for storing the data in the temporary area are continued, and the image reading apparatus 10 awaits the finish of the image conversion and the like.

When the image conversion and the process for storing the data in the temporary area are finished (Step S205; Yes), the CPU 11 calculates the charge fee (Step S206). The charge fee is calculated in accordance with the number of the sheets of the read original, the size of the read original, the color/monochrome of each original, and the like. Then, it is checked whether the money which is not less than the charge fee is inserted in the charging vender device 5 (Step S207).

In case that the money which is not less than the charge fee is not inserted (Step S207; No), the CPU 11 (the judgment unit) judges that the data for all pages of the original cannot be transferred to the USB memory, and awaits the insertion of the money. However, in case that the cancel operation is received before the money which is not less than the charge fee is inserted (Step S208; Yes), the inserted money is returned and the job is stopped. Then, the process is ended.

When the money which is not less than the charge fee is inserted (Step S207; Yes), the CPU 11 (the judgment unit) judges that the data for all pages of the original can be transferred to the USB memory. Then, the CPU 11 (the executing unit) instructs each unit of the image reading apparatus 10 to transfer the data stored in the temporary area to the USB memory connected with the connecting unit 23 (Step S209). When the transfer of the data is finished, the charge fee is collected (Step S210). Then, the process is ended. Alternatively, in the process, the sequence of the steps can be changed as follows. In case that the reading of all pages of the original is finished (Step S204; Yes), the process proceeds to Steps S206 and S207. In case that the money which is not less than the charge fee is inserted (Step S207; Yes), in Step S205, it may be checked whether the image conversion and the process for storing the data in the temporary area are finished.

Figure 5:
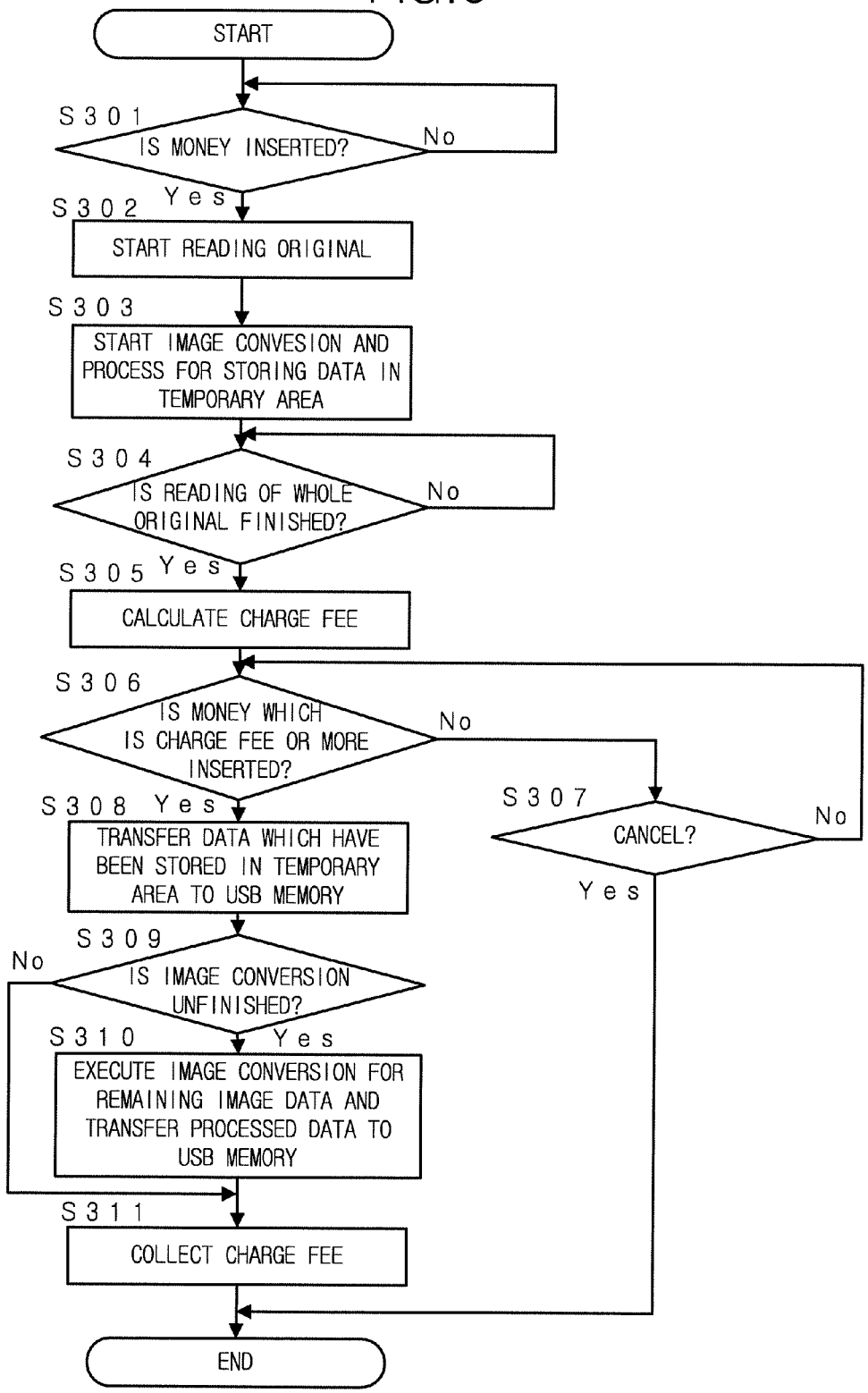
FIG. 5 is a flowchart showing the process for executing the Scan To USB job in accordance with the second mode of the process method C by the image reading apparatus according to the embodiment.

FIG. 5 shows the process for executing the Scan To USB job in accordance with the second mode of the process method C. The process from Step S301 to Step S304 is the same as the process from Step S201 to Step S204 in FIG. 4. Therefore, the explanation thereof is omitted.

When the reading of the whole original is finished (Step S304; Yes), the charge fee is calculated (Step S305). Then, it is checked whether the money which is not less than the charge fee is inserted in the charging vender device 5 (Step S306).

In case that the money which is not less than the charge fee is not inserted (Step S306; No), the CPU 11 (the judgment unit) judges that the data for all pages of the original cannot be transferred to the USB memory, and awaits the insertion of the money. However, in case that the cancel operation is received while the CPU 11 awaits the insertion of the charge fee (Step S307; Yes), the inserted money is returned and the job is stopped. Then, the process is ended.

When the money which is not less than the charge fee is inserted (Step S306; Yes), the CPU 11 (the judgment unit) judges that the data for all pages of the original can be transferred to the USB memory. Then, the CPU 11 (the executing unit) instructs each unit of the image reading apparatus 10 to temporarily stop the image conversion and to transfer the data which have been stored in the temporary area before now to the USB memory (Step S308). Further, it is checked whether the image conversion and the process for storing the data in the temporary area, which are executed for the image data of the read whole original are unfinished (Step S309). When the image conversion and the process for storing the data in the temporary area are finished (Step S309; No), the charge fee is collected (Step S311). Then, the process is ended.

In case that the image conversion and the process for storing the data in the temporary area are unfinished (Step S309; Yes), the CPU 11 (the executing unit) changes the transfer route and instructs each unit of the image reading apparatus 10 to restart the image conversion. That is, the data obtained by the restarted image conversion are directly transferred to the USB memory without using the temporary area (Step S310). When the image conversion and the process for transferring the data to the USB memory, which are executed for the image data of the read whole original, are finished, the charge fee is collected (Step S311). Then, the process is ended.

In the process shown in FIG. 5, in case that the image data to be converted are left after it is confirmed that the amount of the inserted money is not less than the charge fee, the data obtained by the image conversion are directly transferred to the USB memory without using the temporary area. Therefore, as compared with the case in which the data are transferred to the USB memory via the temporary area, the load caused by transferring the data is reduced. As a result, it is possible to shorten the whole process time for executing the job.

In case that the data are stored in the USB memory as a file, in the process shown in FIG. 4, because the data are transferred to the USB memory after the image data corresponding to the whole original are converted and the data obtained by the image conversion are stored in the temporary area, it is possible to transfer the data as one file to the USB memory. In the process shown in FIG. 5, the data to be transferred to the USB memory in Step S308 and the data to be transferred to the USB memory in Step S310 are formed as separate files. However, in case of the job in which the data for each page is stored as a separate file, the above problem is not caused.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

For example, in the embodiment, the Scan To USB job for designating the USB memory connected with the connecting unit 23 as the transfer destination is explained as an example. The transfer destination (the destination) is not limited to this. For example, the transfer destination (the destination) may be an external terminal which is connected via a network, or the like. In case that an external terminal is the transfer destination, the data transfer may be executed by the network transmission using the protocol, such as SMB, FTP or the like, or by transmitting the data as a file attached to an e-mail. Further, a tablet terminal connected by using the Wi-Fi, or the like may be set to the transfer destination. In this case, the network communication unit 17 has the function as the transfer unit for transferring the data to the designated destination.

Further, in the embodiment, in accordance with the charge check, it is judged whether the data can be transferred. However, the judgment process for judging whether the data can be transferred may be executed in accordance with another standard. For example, in case that the upper limit of the number of the available sheets is managed for each user or each group, the CPU 11 (the judgment unit) compares the number of the remaining sheets which can be used by the user or in the group with the number of the sheets of the read original. In case that the number of the remaining sheets is not less than the number of the sheets of the read original, the CPU 11 judges that the data can be transferred. In case that the number of the remaining sheets is less than the number of the sheets of the read original, the CPU 11 judges that the data cannot be transferred.

Further, the judgment process for judging whether the data can be transferred may be executed in accordance with the free space of the USB memory or the like. That is, in case that the data size of the data obtained by the image conversion executed for the whole original is not less than the free space of the USB memory, the CPU 11 judges that the data can be transferred. In case that the above data size is less than the free space of the USB memory, the CPU 11 judges that the data cannot be transferred.

Further, in the embodiment, after the reading of the whole original is finished, the charge check (the judgment process for judging whether the data can be transferred) is executed. However, for example, the amount of the inserted money is repeatedly checked, and the data which can be processed in proportion to the amount of the inserted money may be transferred. On the other hand, with respect to the data which cannot be processed in proportion to the amount of the inserted money, the image conversion and the process for storing the data in the temporary area are executed, and the data transfer is stopped. Then, in case that the money is inserted more, the data transfer may be executed in proportion to the amount of the inserted money.

In the embodiment, before it is judged that the data can be transferred, the image conversion is executed for the image data of the read original and the data obtained by the image conversion is stored in the temporary area. However, it is not necessary to store the data in the temporary area after all of the processes to be executed before the data transfer are executed. For example, in the temporary area, the data for each page is stored as a separate file. After it is judged that the data can be transferred, the separate files may be incorporated into one or some files and one or some files may be transferred. Before it is judged that the data can be transferred, all of the processes to be executed before the data transfer may be executed and the data may be stored in the temporary area. In this case, because only the data transfer is executed when it is judged that the data can be transferred, it is possible to shorten the process time.

In the embodiment, it is disclosed that the image data is converted into a file having the PDF format or the like and the file is transferred to the transfer destination. However, it is not necessarily required to form a file. The data format may be optionally selected. Further, another file format can be used.

One of the objects of the above embodiment is to provide an image reading apparatus and a non-transitory computer-readable recording medium which prevents the processed data from being transferred to an external device without paying the charge fee in case that a user is charged for the job for converting the image data obtained by reading an original and for transmitting the data to the external device, and which can shorten the whole process time.

In this embodiment, regardless of whether the judgment unit judges that the data can be transferred, the original is read by the reading unit, the image conversion is executed by the image conversion unit and the data obtained by the image conversion is stored in the storing unit. The data obtained by the image conversion is transferred after the judgment unit judges that the data can be transferred. Because the image conversion is executed before the judgment unit judges that the data can be transferred, it is possible to shorten the whole process time to finish the job as compared with the case in which the image conversion is executed after the judgment unit judges that the data can be transferred.

In this embodiment, in case that the usage fee is charged, the judgment unit judges whether the data can be transferred according to whether the amount of inserted money is not less than the charge fee. In case that the upper limit of the number of sheets which can be used by each user or in each group is set, the judgment unit judges whether the data can be transferred, by comparing the number of the remaining sheets to the upper limit with the number of the sheets of the original.

In this embodiment, for example, the recording medium is a USB memory. The recording medium may be an SD card or the like.

In this embodiment, because the charge fee or the number of the sheets of the original is determined after the reading of the all pages of the original is finished, the judgment unit judges whether the data can be transferred after the charge fee or the like is determined.

This embodiment is preferable in case that all data obtained by the image conversion are transferred to the destination as one file.

In this embodiment, in case that the image data which has not been converted is left after the judgment unit judges that the data can be transferred, the data obtained by converting the left image data is directly transferred to the destination without using the storing unit. Therefore, the load caused by transferring the data is reduced. As a result, it is possible to shorten the process time.

In this embodiment, in case that the judgment unit does not judge whether the data can be transferred, the data obtained by the image conversion is directly transferred to the destination without using the storing unit. Therefore, the data transfer can be early started and it is possible to shorten the whole process time.

According to the image reading apparatus and the non-transitory computer-readable recording medium, it is possible to prevent the processed data from being transferred to an external device without paying the charge fee in case that a user is charged for the job for converting the image data obtained by reading an original and for transmitting the data to the external device, and to shorten the whole process time.

The present U.S. patent application claims the priority of Japanese Patent Application No. 2014-085016, filed on Apr. 16, 2014, according to the Paris Convention, and the entirety of which is incorporated herein by reference for correction of incorrect translation.

What is claimed is:

1. An image reading apparatus, comprising:
a reading unit configured to optically read an original and to output image data corresponding to the original; and
a hardware processor configured to
convert the image data into converted data having a predetermined format,
store the converted data having the predetermined format, which is obtained by converting the image data,
transfer the converted data to a designated destination,
judge whether the converted data can be transferred to the designated destination, and
instruct the image reading apparatus to execute a process for reading the original by the reading unit and for converting the image data output from the reading unit to store the converted data in a storing unit regardless of whether the hardware processor judges that the converted data can be transmitted, and to instruct the image reading apparatus to transfer the converted data after the hardware processor judges that the converted data can be transmitted,
wherein after the reading unit finishes reading all pages of the original, the hardware processor judges whether the converted data for all pages of the original can be transferred to the destination, and
wherein after the hardware processor judges that the converted data for all pages of the original can be transferred to the destination, the hardware processor changes a transfer route so as to transfer the converted data to the destination without using the storing unit, and instructs the image reading apparatus to read the converted data which was stored in the storing unit before the transfer route is changed, from the storing unit and to transfer the read converted data to the destination.

2. An image reading apparatus, comprising:
a reading unit configured to optically read an original and to output image data corresponding to the original; and
a hardware processor configured to
convert the image data into converted data having a predetermined format,
store the converted data having the predetermined format, which is obtained by converting the image data,
transfer the converted data to a designated destination,
judge whether the converted data can be transferred to the designated destination, and
instruct the image reading apparatus to execute a process for reading the original by the reading unit and for converting the image data output from the reading unit to store the converted data in a storing unit regardless of whether the hardware processor judges that the converted data can be transmitted, and to instruct the image reading apparatus to transfer the converted data after the hardware processor judges that the converted data can be transmitted,
wherein it is selected whether the hardware processor judges whether the converted data can be transmitted,
in case that the hardware processor does not judge whether the converted data can be transmitted, the hardware processor instructs the image reading apparatus to transmit the converted data to the destination without using the storing unit.

3. The apparatus of claim 1, wherein the hardware processor judges whether the converted data can be transferred, by comparing an amount of inserted money with a charge fee, or by comparing number of remaining sheets to an upper limit of number of available sheets with number of sheets of the original.

4. The apparatus of claim 1, further comprising a connecting unit configured to detachably connect a recording medium,
wherein the recording medium connected with the connecting unit is allowed to be designated as the destination.

5. The apparatus of claim 1, wherein the hardware processor instructs the image reading apparatus to start transferring the converted data after the hardware processor finishes converting the image data for all pages of the original into the converted data.

6. The apparatus of claim 1, wherein the designated destination is a storing medium which is connected with the image reading apparatus and which is different from the image reading apparatus, or is an external device which is connected with the image reading apparatus via a network which is different from the image reading apparatus.

7. The apparatus of claim 1, wherein the converted data is a compression data.

8. The apparatus of claim 2, wherein the hardware processor judges whether the converted data can be transferred, by comparing an amount of inserted money with a charge fee, or by comparing number of remaining sheets to an upper limit of number of available sheets with number of sheets of the original.

9. The apparatus of claim 2, further comprising a connecting unit configured to detachably connect a recording medium,
wherein the recording medium connected with the connecting unit is allowed to be designated as the destination.

10. The apparatus of claim 2, wherein the hardware processor instructs the image reading apparatus to start transferring the converted data after the hardware processor finishes converting the image data for all pages of the original into the converted data.

11. The apparatus of claim 2, wherein the designated destination is a storing medium which is connected with the image reading apparatus and which is different from the image reading apparatus, or is an external device which is connected with the image reading apparatus via a network which is different from the image reading apparatus.

12. The apparatus of claim 2, wherein the converted data is a compression data.

13. A non-transitory computer readable medium having stored thereon computer readable instructions that, when executed by a hardware processor of an image reading apparatus, cause the image reading apparatus to convert and transfer data, the image reading apparatus comprising a reading unit configured to optically read an original and to output image data corresponding to the original, the computer readable instructions comprising:
instructions to convert the image data into converted data having a predetermined format;
instructions to store the converted data having the predetermined format, which is obtained by converting the image data;
instructions to transfer the converted data to a designated destination;
instructions for the hardware processor to judge whether the converted data can be transferred to the designated destination;
instructions to instruct the image reading apparatus to execute a process for reading the original by the reading unit and for converting the image data output from the reading unit to store the converted data in a storing unit regardless of whether the hardware processor judges that the converted data can be transmitted, and to instruct the image reading apparatus to transfer the converted data after the hardware processor judges that the converted data can be transmitted;
wherein the instructions for the hardware processor cause, after the reading unit finishes reading all pages of the original, the hardware processor to judge whether the converted data for all pages of the original can be transferred to the destination; and
wherein the instructions for the hardware processor cause, after the hardware processor judges that the converted data for all pages of the original can be transferred to the destination, the hardware processor to change a transfer route so as to transfer the converted data to the destination without using the storing unit, and to instruct the image reading apparatus to read the converted data which was stored in the storing unit before the transfer route is changed, from the storing unit and to transfer the read converted data to the destination.

14. The non-transitory computer readable medium of claim 13, wherein the instructions for the hardware processor cause the hardware processor to judge whether the converted data can be transferred, by comparing an amount of inserted money with a charge fee, or by comparing number of remaining sheets to an upper limit of number of available sheets with number of sheets of the original.

15. The non-transitory computer readable medium of claim 13, wherein the image reading apparatus further comprises a connecting unit configured to detachably connect a recording medium,
wherein the recording medium connected with the connecting unit is allowed to be designated as the destination.

16. The non-transitory computer readable medium of claim 13, wherein the instructions for the hardware processor cause, after the reading unit finishes reading all pages of the original, the hardware processor to judge whether the converted data for all pages of the original can be transferred to the destination.

17. The non-transitory computer readable medium of claim 13, wherein the instructions for the hardware processor cause the hardware processor to instruct the image reading apparatus to start transferring the converted data after the hardware processor finishes converting the image data for all pages of the original into the converted data.

18. The non-transitory computer readable medium of claim 16, wherein the instructions for the hardware processor cause, after the hardware processor judges that the converted data for all pages of the original can be transferred to the destination, the hardware processor to change the transfer route so as to transfer the converted data to the destination without using the storing unit, and to instruct the image reading apparatus to read the converted data, which was stored in the storing unit before the transfer route is changed, from the storing unit and to transfer the read converted data to the destination.

19. The non-transitory computer readable medium of claim 13, wherein it is selected whether the hardware processor of the image reading apparatus judges whether the converted data can be transmitted,
wherein the instructions for the hardware processor cause, in case that the hardware processor does not judge whether the converted data can be transmitted, the hardware processor to instruct the image reading apparatus to transmit the converted data to the destination without using the storing unit.

20. The non-transitory computer readable medium of claim 13, wherein the designated destination is a storing medium which is connected with the image reading apparatus and which is different from the image reading apparatus, or is an external device which is connected with the image reading apparatus via a network which is different from the image reading apparatus.

21. The non-transitory computer readable medium of claim 13, wherein the converted data is a compression data.

22. A non-transitory computer readable medium having stored thereon computer readable instructions that, when executed by a hardware processor of an image reading apparatus, cause the image reading apparatus to convert and transfer data, the image reading apparatus comprising a reading unit configured to optically read an original and to output image data corresponding to the original, the computer readable instructions comprising:
instructions to convert the image data into converted data having a predetermined format;
instructions to store the converted data having the predetermined format, which is obtained by converting the image data;

instructions to transfer the converted data to a designated destination;

instructions for the hardware processor to judge whether the converted data can be transferred to the designated destination; and instructions to instruct the image reading apparatus to execute a process for reading the original by the reading unit and for converting the image data output from the reading unit to store the converted data in a storing unit regardless of whether the hardware processor judges that the converted data can be transmitted, and to instruct the image reading apparatus to transfer the converted data after the hardware processor judges that the converted data can be transmitted, wherein it is selected whether the hardware processor judges whether the converted data can be transmitted, and wherein the instructions for the hardware processor cause, in case that the hardware processor does not judge whether the converted data can be transmitted, the hardware processor to instruct the image reading apparatus to transmit the converted data to the destination without using the storing unit.

23. The non-transitory computer readable medium of claim 22, wherein the instructions for the hardware processor cause the hardware processor to judge whether the converted data can be transferred, by comparing an amount of inserted money with a charge fee, or by comparing number of remaining sheets to an upper limit of number of available sheets with number of sheets of the original.

24. The non-transitory computer readable medium of claim 22, wherein the image reading apparatus further comprises a connecting unit configured to detachably connect a recording medium, wherein the recording medium connected with the connecting unit is allowed to be designated as the destination.

25. The non-transitory computer readable medium of claim 22, wherein the instructions for the hardware processor cause, after the reading unit finishes reading all pages of the original, the hardware processor to judge whether the converted data for all pages of the original can be transferred to the destination.

26. The non-transitory computer readable medium of claim 22, wherein the instructions for the hardware processor cause the hardware processor to instruct the image reading apparatus to start transferring the converted data after the hardware processor finishes converting the image data for all pages of the original into the converted data.

27. The non-transitory computer readable medium of claim 25, wherein the instructions for the hardware processor cause, after the hardware processor judges that the converted data for all pages of the original can be transferred to the destination, the hardware processor to change a transfer route so as to transfer the converted data to the destination without using the storing unit, and to instruct the image reading apparatus to read the converted data, which was stored in the storing unit before the transfer route is changed, from the storing unit and to transfer the read converted data to the destination.

28. The non-transitory computer readable medium of claim 22, wherein it is selected whether the hardware processor of the image reading apparatus judges whether the converted data can be transmitted, wherein the instructions for the hardware processor cause, in case that the hardware processor does not judge whether the converted data can be transmitted, the hardware processor to instruct the image reading apparatus to transmit the converted data to the destination without using the storing unit.

29. The non-transitory computer readable medium of claim 22, wherein the designated destination is a storing medium which is connected with the image reading apparatus and which is different from the image reading apparatus, or is an external device which is connected with the image reading apparatus via a network which is different from the image reading apparatus.

30. The non-transitory computer readable medium of claim 22, wherein the converted data is a compression data.

* * * * *